[11] 3,586,420

[72] Inventor Bruce Hu
  Liverpool, N.Y.
[21] Appl. No. 861,654
[22] Filed Sept. 29, 1969
[45] Patented June 22, 1971
[73] Assignee General Electric Company

[54] HIGH PERFORMANCE FIVE-GROUP OBJECTIVE LENS
  2 Claims, 3 Drawing Figs.
[52] U.S. Cl. ................................................. 350/176,
  350/215, 350/216
[51] Int. Cl. ........................................ G02b 9/60,
  G02b 9/62
[50] Field of Search ........................................ 350/215,
  216, 223, 176

References Cited
UNITED STATES PATENTS
3,454,326  7/1969  Schlegel ....................... 350/215 X

*Primary Examiner*—John K. Corbin
*Attorneys*—Richard V. Lang, Marvin A. Goldenberg, Frank L. Neuhauser, Oscar B. Waddell and Joseph B. Forman ABSTRACT: A high performance objective lens is disclosed having a relative aperture of $f/0.75$ and good low frequency optical performance. The lens consists of two menisci and three doublet groups to form a five-group lens wherein each group provides positive power. In one doublet group, a special short flint is provided for secondary achromatization. The lens is designed for use in a fluoroscopic examination system taking into account a range of glass thicknesses in the back focal region of the lens suiting it for use with a variety of image intensifiers. The exit pupil is located well in advance of the front element of the lens for efficient optical coupling to multiple optical output devices.

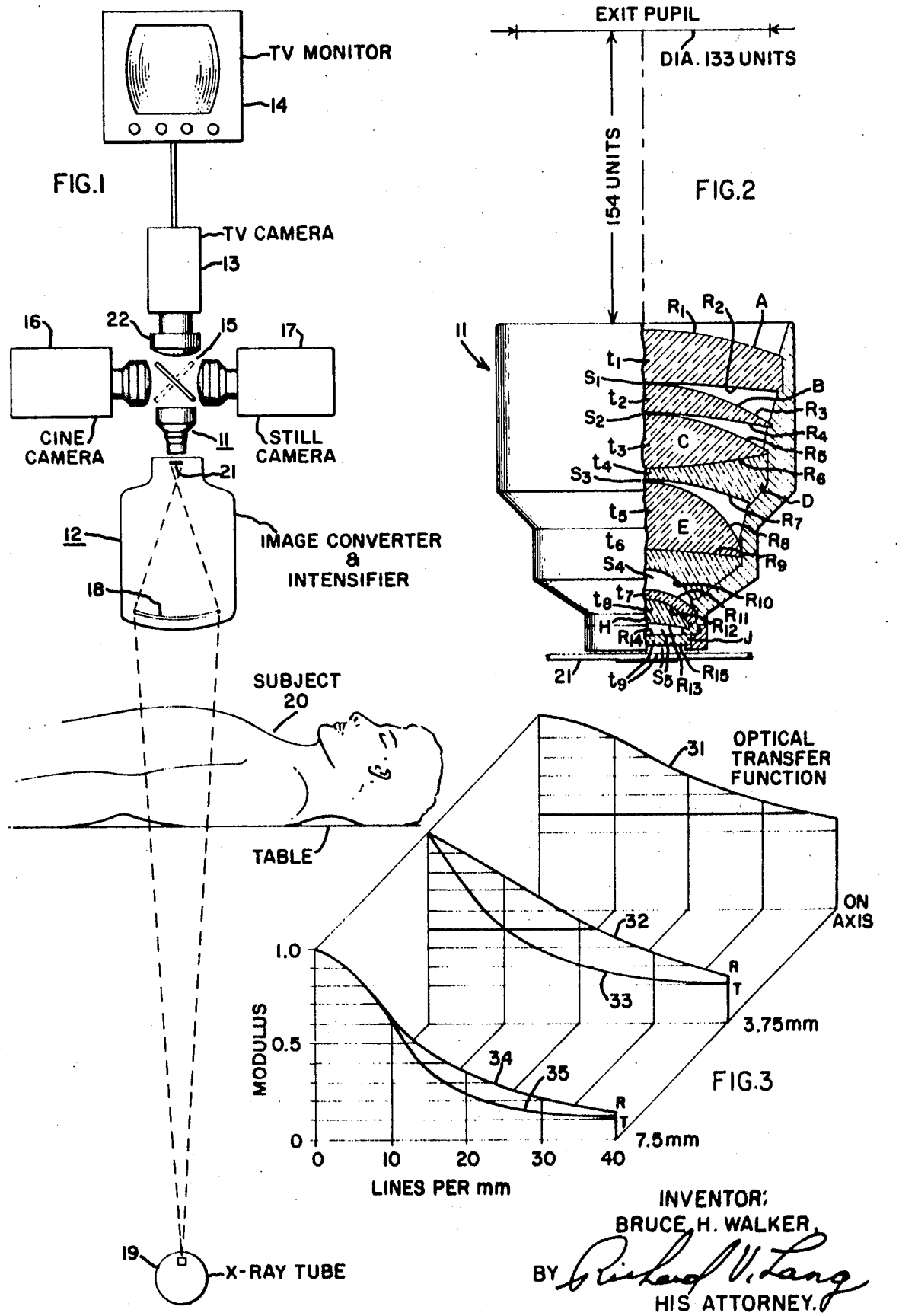

HIGH PERFORMANCE FIVE-GROUP OBJECTIVE LENS

The present lens represents an extension of the design described in U.S. application Ser. No. 861,655 filed on behalf of the applicant on Sept. 29, 1969. The present lens has a higher relative aperture.

BACKGROUND OF THE INVENTION

1. Field of the Invention

The present invention relates to high performance lens designs of high relative apertures (typically $f/0.75$) and is specially characterized by having a good low frequency response.

2. Description of the Prior Art

In a fluoroscopic system employing an X-ray tube and an image intensifier with television of film camera outputs, there is a need for a lens optimized for use in such a system. In fluoroscopic systems for hospital use there is the prime requirement that patient exposure be minimized and to this end it is desirable that the lens be of large aperture. In systems of this type, where the image intensifier output screens provide the input source for the visual image, the limiting resolution occurs in the image intensifier whose line resolution may be on the order of 20 to 25 lines/mm. For the lens to couple an input image of this nature into the output optical system with maximum efficiency, the customary emphasis on high performance at higher spatial frequencies, will not insure a good low frequency response where the information content of the image is largely concentrated. Additionally, when location of the exit pupil is not optimized in respect to the application of the lens or where nonoptimal placement of the exit pupil is tolerated in order to use off-the-shelf lens designs, there are often rather substantial losses in off-axis illumination of the image, i.e. vignetting. A further degradation in lens performance may also occur if the input image must proceed through additional layers of glass without compensation in the design.

SUMMARY OF THE INVENTION

Accordingly, it is an object of the present invention to provide an improved high performance lens for use in a fluoroscopic system.

It is a further object of the invention to provide an improved high performance lens for use with an input image device of low spatial frequency such as an image intensifier.

It is still another object of the present invention to provide a lens arranged to couple an image in a fluoroscopic system to suitable output optical devices with a minimum of vignetting.

It is a further object of the invention to provide a lens adapted to use with varying amounts of glass in the back focal region without degradation of the optical performance.

These and other objects of the invention are achieved in a lens design incorporating two menisci and three doublet groups which form a five group lens wherein each group provides positive power. In one doublet group a special short flint is provided for secondary achromatization. The lens has an aperture of $f/0.75$ and is designed to emphasize good low frequency optical performance. The design also takes into account a number of glass thicknesses in the back focal region of the lens suiting it for use with a variety of image intensifiers. An exit pupil located well in advance of the front element of the lens permits efficient optical coupling to multiple optical output devices.

BRIEF DESCRIPTION OF THE DRAWING

The novel and distinctive features of the invention are set forth in the claims appended to the present application. The invention itself, however, together with the further objects and advantages thereof may best be understood by reference to the following description and accompanying drawings, in which:

FIG. 1 is an illustration of an objective lens made in accordance with the invention disposed in a fluoroscopic system;

FIG. 2 is a more detailed illustration of the lens itself; and

FIG. 3 is a graph illustrating the lens performance in an example having a 65 mm. focal length.

DESCRIPTION OF THE PREFERRED EMBODIMENT

Referring to FIG. 1, the objective lens is shown at 11 in a television aided fluoroscopic system. The objective lens 11 couples an image produced by an X-ray image converter and intensifier tube 12 to a television camera 13 and monitor 14 and optionally through a mirror system 15 to a cine camera 16 or still camera 17. The X-ray image is initially formed on an input screen 18 of the image converter and intensifier tube 12. Conventionally, the X-ray beam is projected from an X-ray tube 19 through a subject 20 and emergent rays, modulated in intensity by the variable opacity of the subject, impinge on the input screen 18. The image converter and intensifier tube 12 forms an optical image of the X-ray image on its output screen 21.

The image converter and intensifier tube 12 provides the optical input for the objective lens 11. The image converter and intensifier tube 12 is a vacuum device which converts a relatively large X-ray image formed on its input screen 18 to a relatively small, more intense optical image at its output screen 21. Common image intensifiers have input screens of from 6 to 9 inches and have an output screen usually of less than 1 inch (15 to 20 mm. in typical systems) across. A 65 mm. example of the present lens has particular application to the smaller of these image intensifiers having a 6 inch input screen and a 15 mm. output screen. Brightness may be increased by a factor of 5,000, and the output is usually of a yellow-green hue.

The image at the image intensifier output screen 21 is coupled by the objective lens 11 to the output optical devices. As illustrated in FIG. 1, one such output device is the television camera 13 and monitor 14. An input lens 22 of the television camera 13 and input lenses of the cine and film cameras 16 and 17 are arranged with respect to the objective lens 11 so as to have an "infinity" conjugate ratio. That is to say, the image intensifier output screen 21 is placed at the focal plane of the objective lens 11 so as to produce essentially parallel light between the objective lens 11 and the television camera lens 22 and similarly, the television camera lens 22 is arranged such that a vidicon target (not shown) within the television camera 13 is in the focal plane of the lens 22, permitting the lens 22 to be focused to infinity. This is an optimum design position for all three optical output devices 13, 16 and 17. The provision of an infinity conjugate ratio creates a parallel wave front between the lens 11 and the three optical output devices, and permits greater latitude in adjustment of the spacing between the respective lenses. At the same time, the interposition of an optically flat beamsplitting device 15 between the lenses for use with the cine or still cameras 16, 17, introduces a minimum of lens error.

The lenses 11 and 22 should be in relatively close mutual proximity to avoid the loss of light from off-axis image points, i.e. vignetting. The lens 11 has its exit pupil, in front of its front element (154 mm. being typical for a lens of 100 mm. focal length). The combination, in one practical example, exhibits approximately 25 percent vignetting when the entrance pupil of lens 22 is located at this position. Preferably the entrance pupils of lens 22 and of the other optical output devices are placed at the exit pupil of the lens 11 with the penalty for greater separations being increased vignetting.

The performance requirements of the objective lens 11 are established by the following system components. To minimize patient exposure to X-ray radiation the lenses 11 and 22 should have relatively large apertures and should be efficiently coupled. One example of the objective lens 11 has a 65 mm. focal length and an aperture of $f/0.75$ corresponding to a lens diameter of 86 mm. Similarly, the television camera lens 22 should have a relatively large aperture, typically from $f/0.75$ to $f/1.0$ and provide an entrance pupil of the same diameter to intercept the image beam.

The maximum useful resolution in the system is ordinarily set by the image intensifier tube 12, which in a typical case, has a resolution of 20 line pairs per mm in the plane of the output screen 21. The X-ray tube itself may be capable of at least twice this resolution and the optical elements are ordinarily of about 4 times this quality. The output monitoring requirements, assuming a standard 525 line television viewing system, establish a resolution requirement of approximately 25 line pairs per mm. at the output screen 21, while a camera output system (such as 16 or 17) may be capable of as great resolution as the optics themselves. The foregoing resolution requirements thus place a premium on objective lenses having good low frequency response and in particular good contrast at spatial frequencies between 0—40 lines/mm. The resulting cutoff frequency in this particular design is a variable with off-axis position of the image. At the margin of the image it is in the vicinity of 40 lines/mm, but approaches 100 lines/mm. at the center of the image. A graph of this performance property based on design data on a 65 mm. example is illustrated in FIG. 3.

The lens 11 had been designed with 5,200 Angstrom units as the nominal center of the spectral range. This corresponds to a common value for image intensifier tubes. The color correction of the lens however is maintained over any reasonable bandwidth (approximately 2,000 Angstrom units) within the visible spectrum suiting the lens for use in a wide variety of practical applications.

A final system requirement which this lens has been designed to meet is that it be fully corrected for differing amounts of glass in the face plates of the various kinds of image intensifier tubes with which it is likely to be used.

The objective lens 11 whose detailed construction is shown in FIG. 2 comprises five positive groups consisting of eight elements and an associated plane member of makeup glass. These groups consist of a pair of menisci A, B, and three cemented doublets CD; EF, and GH. It is the intent of the design that the more or less even distribution of optical power over a large number of lens groups will result in the reduction of aberrations in the final design. Of particular importance in this case is the reduction of spherical aberration, coma, astigmatism and distortion to acceptable values.

In addition, the correction of both axial and lateral chromatic aberration is of equal importance. This has been accomplished mainly by the introduction of the three cemented crown flint combinations (CD, EF and GH). In particular, the residual secondary color aberration has been substantially reduced through the use of a special short flint glass type at element F.

The final element shown in FIG. 2 is a planoparallel window J, which functions as a sheet of makeup glass. It may be treated as a part of the lens proper since retaining rings are ordinarily provided to support it integrally with the other elements A through H. It has a "design" thickness of 5.7 units (3.7mm. in the 65mm. example). This dimension represents the maximum dimension of intensifier tube face plate thicknesses that can be accommodated without degradation. When the lens is used with such a tube of maximum thickness, no makeup glass is included in the lens assembly. If a tube having a lesser face plate thickness is used, a sheet of makeup glass is provided of such thickness as is required to make the total thickness of glass between element GH and the image equal to the original "design" thickness of 5.7 units (3.7mm., 65mm. example).

The foregoing elements provide a highly corrected objective lens having an aperture of $f/0.75$ suitable for use in the fluoroscopic system so far described. In the example referred to, where the focal length of the lens is 65mm., the lens has an image format of 15mm. in diameter and an exit pupil 86mm. in diameter located 100mm. in front of the front element 23. The overall vignetting factor is significantly reduced due to the strategic placement of the exit pupil of objective lens 11 close to the entrance pupil of the television camera lens 22. In the case of a normal design, the pupil would be located within the lens 11 and for a given positive off-axis point, the upper portion of the light bundle from the image would be vignetted within the lens 11. When this light bundle encounters the television camera objective lens 22, the lower portion of the bundle will ordinarily be additionally vignetted, resulting in a total vignetting factor on the order of 60 percent. Having the exit pupil remote from the lens as is the case for the objective lens 11 herein considered, results in the unusual condition wherein vignetting occurs at the lower portion of the light bundle from the lens 11. This vignetted loss in the objective lens 11 is largely coincident with the vignetted loss from the TV objective, which also vignets the lower portion of the bundle. Thus by a super position of the exit pupil of the lens 11 upon the entrance pupil of the TV lens 22, the overall vignetting is reduced to 25 percent. (If as illustrated in FIG. 2, the axis of the lens 11 is vertically oriented, "upper" and "lower" and "positive" off-axis points refer to corresponding lateral displacements.)

In order to place the exit pupil of the objective lens 11 well in front of the lens in the interest of reducing vignetting, certain additional conditions are imposed upon the lens design. In particular, several of the lens elements are made considerably larger in clear aperture than in conventional designs. Secondly, the lens performance is optimized with reference to those rays which pass through the remote exit pupil rather than those which pass through an exit pupil internal to the lens assembly.

A table of the final lens design at a standardized equivalent focal length of 100 and a relative aperture of $f/0.75$ is given below:

| Lens | Radii | Thickness | Air space | $Nd$ | $\nu d$ | Clear aperture diameter |
|---|---|---|---|---|---|---|
| A | $R_1=158.1$ | $t_1=27.7$ | | 1.639 | 55.5 | 138.0 |
|   | $R_2=398.0$ | | $S_1=.15$ | | | 138.0 |
| B | $R_3=122.5$ | $t_2=13.8$ | | 1.603 | 60.6 | 132.0 |
|   | $R_4=224.3$ | | $S_2=.15$ | | | 132.0 |
| C | $R_5=126.3$ | $t_3=27.7$ | | 1.547 | 53.6 | 124.0 |
| D | $R_6=-258.2$ | $t_4=6.15$ | | 1.785 | 25.8 | 124.0 |
|   | $R_7=145.8$ | | $S_3=.15$ | | | 110.0 |
| E | $R_8=54.0$ | $t_5=37.8$ | | 1.713 | 53.8 | 98.5 |
| F | $R_9=312.0$ | $t_6=10.8$ | | 1.653 | 39.7 | 98.5 |
|   | $R_{10}=24.4$ | | $S_4=11.4$ | | | 46.0 |
| G | $R_{11}=33.0$ | $t_7=6.15$ | | 1.713 | 53.8 | 46.0 |
| H | $R_{12}=30.5$ | $t_8=13.5$ | | 1.803 | 46.8 | 46.0 |
|   | $R_{13}=100.0$ | | $S_5{}^2=9.2$ | | | 40.0 |
| J | $R_{14}=\infty$ | $t_9=5.7$ [1] | | 1.517 | 64.2 | 40.0 |
|   | $R_{15}=\infty$ | | | | | 40.0 |

[1] Tube face plate plus make-up glass.
[2] $S_5$ is the total air space between $R_{13}$ and image plane.
NOTE: Image format 22.2 units dia.; full field angle 12½ degrees.

The tabulated figures are nominal dimensions for use in manufacturing and are subject to conventional manufacturing tolerances. The design performance of the lens in a 65mm. focal length example is illustrated in FIG. 3 where the modulation transfer function is plotted along a three-coordinate axis. The modulation transfer function, whose modulus is the vertical coordinate in FIG. 3, is a representation of the ability of the lens to reproduce an object at varying spatial frequencies whose intensity varies in a sinusoidal fashion. The ability to reproduce such sinusoidal variations, which is graphed in FIG. 3, is a ratio of the modulation of the image relative to the modulation of the object. It might be spoken of as the contrast ratios between the image and the object. This property has been plotted against spatial frequency and axial position along the object. In FIG. 3, the line 31 corresponds to an on-axis position; the lines 32, 33, to a position 3.75mm. off axis; and the lines 34, 35, to off-axis positions of 7.5mm. The symbols "R" and "T" illustrated on the line traces 32—35 slow a separate treatment for radially and tangentially oriented resolution lines. This difference in treatment is an indication of nonsymmetrical point images. The modulus is plotted at each of the given object positions against the third coordinate, namely the spatial frequencies in lines/mm. It may be seen that the graph illustrates measurement through the range of from 0 to 40 lines/mm.

From a consideration of this graph, it will be seen that the modulus of the optical transfer function is 1 at the origin (on the object axis, at zero spatial frequency) and remains close to unity at low spatial frequencies irrespective of the axial position on the object. As the spatial frequency increases from 0 to 40 lines/mm., the function generally decreases, the decrease tending to becoming more marked as one moves off axis along the object. If one takes the particular line frequency of 40 lines/mm., the modulus falls from an initial value of approximately 0.45 to approximately 0.12 at the 7.5mm. off-axis object position. As previously noted, the maximum useful frequency due to the intensifier tube characteristics is approximately 20 lines/mm. For the three field points at 20 lines/mm., the modulus has approximate values of 0.7, 0.50 and 0.30.

The curves illustrated in FIG. 3 describe a lens whose cutoff frequency is approximately 400 lines/mm at marginal object positions and 100 lines/mm. in the central object positions. The cutoff region may be regarded as the point at which the modulus falls below a useful level, usually in the region of the modulus of 0.10. The curves in FIG. 3 thus denote a lens design emphasizing good low frequency response throughout the desired design region below 20 lines/mm., with some reserve up to 40 lines/mm.

A residual of astigmatism exists and may be regarded as a differential treatment of the radial and tangentially oriented lines.

The values indicated in FIG. 3 represent good performance from a lens design standpoint in the indicated system. The lens represents some slight reduction in its optical transfer position when compared to a lens of smaller aperture such as the $f/1.0$ lens described in the referenced application of the Applicant.

The above table provides the design data for a lens incorporating the invention. Since the table is given in arbitrary units it is intended for the design of lenses over a range of focal lengths, of which a typical example is the 65mm. focal length lens previously discussed. The lens design retains its high quality over a range of locations of the exit pupil. Consequently, one may employ the tabular values of the clear diameters of the elements wherein a number of the elements are oversized to place the exit pupil well in advance of the lens to achieve a minimum of vignetting in the present coupled optics application. If such an application is not contemplated, however, and a more conventionally located internal exit pupil is desired, the oversized elements may be reduced to conventional values.

The lens design contemplates 5.7 units of the indicated variety of glass in the back focus of the lens between the last doublet GH and the object (input image) plane. The quantity $S_5$ includes the air space between elements H and J and the air space between J and the faceplate 21 of the image intensifier. $S_5$ thus includes the total air space between the surface $R_{13}$ and the object plane and is fixed at the indicated design value. The space between $R_{13}$ and the makeup glass, when such glass is necessary, is variable. It will generally be more than 1.5 units (due to curvature of the last doublet element) and will approach 5.75 units as makeup glass is totally excluded.

What I claim as new and desired to be secured by Letters Patent in the United States is:

1. An objective lens of improved low frequency response comprising two menisci (A and B) and three doublet groups (CD, EF, GH) to form a five group lens wherein each group provides positive power in accordance with the following detailed data:

| Lens | Radii | Thickness | Air space | Nd | νd |
|---|---|---|---|---|---|
| A | $R_1=158.1$ | $t_1=27.7$ | | 1.639 | 55.5 |
|  | $R_2=398.0$ |  | $S_1=.15$ |  |  |
| B | $R_3=122.5$ | $t_2=13.8$ | | 1.603 | 60.6 |
|  | $R_4=224.3$ | | $S_2=.15$ | | |
| C | $R_5=126.3$ | $t_3=27.7$ | | 1.547 | 53.6 |
| D | $R_6=-258.2$ | $t_4=6.15$ | | 1.785 | 25.8 |
|  | $R_7=145.8$ | | $S_3=.15$ | | |
| E | $R_8=54.0$ | $t_5=37.8$ | | 1.713 | 53.8 |
| F | $R_9=312.0$ | $t_6=10.8$ | | 1.653 | 39.7 |
|  | $R_{10}=24.4$ | | $S_4=11.4$ | | |
| G | $R_{11}=33.0$ | $t_7=6.15$ | | 1.713 | 53.8 |
|  | $R_{12}=30.5$ | | | | |
| H | $R_{13}=100.0$ | $t_8=13.5$ | | 1.803 | 46.8 |
|  |  | | $S_5{}^2=9.2$ | | |
| J | $R_{14}=\infty$ | $t_9=5.7$ [1] | | 1.517 | 64.2 |
|  | $R_{15}=\infty$ | | | | |

[1] Tube face plate and make-up glass.
[2] $S_5$ is the total air space between $R_{13}$ and image plane.

NOTE: EFL=100 units $f/0.75$.

2. An objective lens as set forth in claim 1 having its exit pupil 154 units in front of the element A, characterized in that the clear apertures are in accordance with the following detailed data:

| Lens | Radii | Clear aperture diameter |
|---|---|---|
| A | $R_1$ | 138.0 |
|  | $R_2$ | 138.0 |
| B | $R_3$ | 132.0 |
|  | $R_4$ | 132.0 |
| C | $R_5$ | 124.0 |
| D | $R_6$ | 124.0 |
|  | $R_7$ | 110.0 |
| E | $R_8$ | 98.5 |
| F | $R_9$ | 98.5 |
|  | $R_{10}$ | 46.0 |
| G | $R_{11}$ | 46.0 |
| H | $R_{12}$ | 46.0 |
|  | $R_{13}$ | 40.0 |
| J | $R_{14}=\infty$ | 40.0 |
|  | $R_{15}=\infty$ | 40.0 |